United States Patent [19]

Burnett

[11] 4,079,538

[45] Mar. 21, 1978

[54] FISHHOOK ASSEMBLY

[76] Inventor: Harvey L. Burnett, 404 Shirley St., DeRidder, La. 70634

[21] Appl. No.: 736,102

[22] Filed: Oct. 27, 1976

[51] Int. Cl.² ............................................. A01K 83/02
[52] U.S. Cl. ............................................. 43/36; 43/37
[58] Field of Search ............... 43/34, 35, 36, 37, 43.4, 43/42.35, 42.38, 44.83, 44.88

[56] References Cited

U.S. PATENT DOCUMENTS

| | | | |
|---|---|---|---|
| 2,456,665 | 12/1948 | Adams | 43/37 |
| 3,026,645 | 3/1962 | Burnett | 43/37 |
| 3,518,784 | 7/1970 | Kling et al. | 43/44.83 |

Primary Examiner—Louis G. Mancene
Assistant Examiner—Robert P. Swiatek
Attorney, Agent, or Firm—John F. Sieberth

[57] ABSTRACT

The assembly has a body with a tubular chamber containing an anchoring element in the form of a spring wire having a looped central portion and a pair of diverging arms, each of which has an apex portion snugly resting against the wall of the chamber. Two or more fishhooks are connected by means of loops to the looped central portion. The shanks of the fishhooks pass through openings in a plug sealing off the back end of the chamber and also through slots in the back end of the tubular body. When a bait is taken the anchoring element is pulled and as a consequence, slides toward the back end of the chamber. As the shanks of the fishhooks are progressively pulled out of the body they are caused to spread apart by the plug. The barbs are thus caused to penetrate opposite sides of the mouth of the fish.

7 Claims, 5 Drawing Figures

U.S. Patent    March 21, 1978    4,079,538
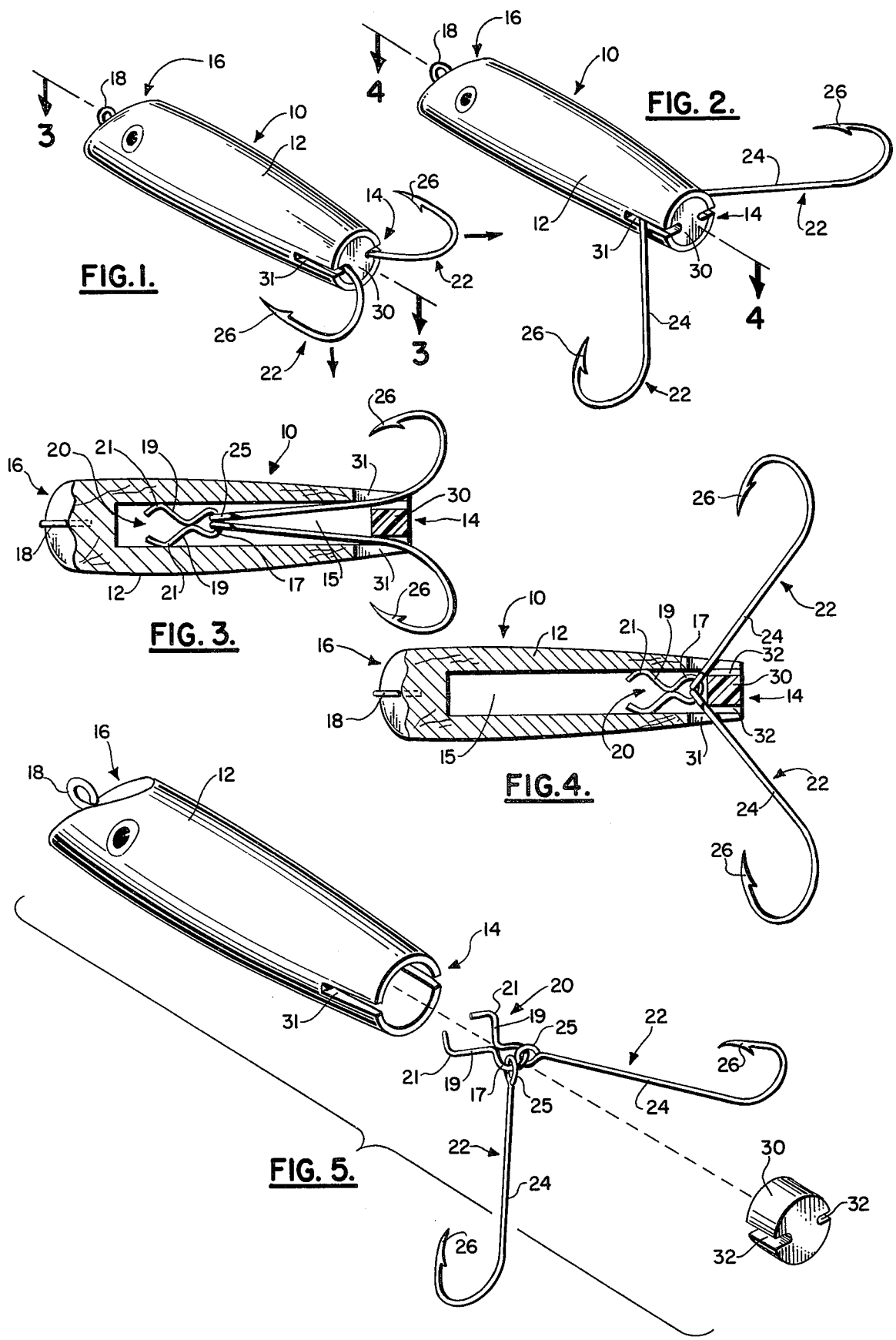

FISHHOOK ASSEMBLY

The present invention relates to a fishhook assembly of the type which has two or more barbs which penetrate opposite sides of the mouth of a fish when a bait is taken.

Previously proposed and used are fishhooks employing one or more barbs which are actuated by spring means into penetrating engagement with the sides of the mouth of a fish when the bait is taken. Such fishhooks have not been wholly successful for many reasons. Frequently, such a fishhook is unsuccessful for the reason that its spring is too lightly loaded for the purpose intended and fails to drive the fishhooks into the sides of the mouth of the fish with sufficient force to impale the fish thereon. The increasing of the loading of the spring means of such a fishhook often fails to correct this defect for the reason that with the spring more heavily loaded, the release means for the spring or spring means may fail to release when a less than average size fish takes the bait from such fishhook. Additionally, the fishhooks of the type described are difficult to handle and store with other fishing tackle due to the spring-load of the barbs which may inadvertently be released while being handled. Besides entangling the barbs of such a fishhook with other fishing tackle, the spring-loading of the barbs is a source of considerable annoyance and possible hazard to the user of the fishhook.

In my prior patent U.S. Pat. No. 3,026,645, all disclosure of which is incorporated herein by reference, I have described a fishhook assembly which overcomes most if not all of the foregoing difficulties. In that assembly positive means other than spring means are utilized for driving the barbs away from each other and into the opposite sides of the mouth of a fish when a bait is taken.

Despite the efficacy and advantages of the assembly described in that patent, experience has shown that certain features or characteristics thereof are not completely satisfactory. In particular, it has been found that the anchoring element 20, in the form of a solid conformably shaped to snugly fit within the tube or cylinder 12 of my previously disclosed device occasionally tended to stick or become wedged within the tube thereby imparing optimum performance of the system. Promoting the tendency of such sticking or wedging were the effects of water-logging or swelling, temperature fluctuations and accumulation of salt, sand, grit or other fine debris found in the water. This invention overcomes these difficulties while at the same time retaining all of the advantageous features of my fishhook assembly as described in the foregoing patent.

SUMMARY OF THE INVENTION

In accordance with this invention the foregoing advantages are accomplished by providing a fishhook assembly which comprises:

(i) a body having therein a tubular chamber open at one end and having a plurality of slots extending longitudinally from the open end thereof;

(ii) an anchoring element in the form of a spring wire having a looped central portion and a pair of arms tending when under compression to move divergently from each other, each arm having intermediate its length an outwardly extending apex portion positioned to snugly rest against the wall of said tubular chamber and to slide therealong upon application to the element of a longitudinally directed force;

(iii) a plurality of fishhooks each including a shank, a barb at one end of the shank and a loop at the other end of the shank, each said fishhook being fastened by means of said loop to the looped central portion of said anchoring element, said shanks arranged in spaced nested relation within said tubular chamber when said element is away from the open end of said body; and (iv) a guiding and supporting member positioned within said body inwardly of and adjacent the open end of said body and fixedly attached to said body, said member having a plurality of openings extending therealong, each opening being adjacent a slot in said body, said member also having a guiding surface adjacent each said opening, said guiding surface being adapted to slidably receive the shank of a fishhook and upon application of a pulling force upon a fishhook to cause said fishhooks to project outwardly from said openings and through said slots in divergent directions as the apex portions of said element slidably travel toward said member.

It is preferable, though not absolutely essential, that the tubular chamber of the body have the same diameter throughout its effective length—i.e., the length of the bore through which the anchoring element slidably travels both toward and away from the open end of the body. In this way the tension upon the arms of the anchoring element is kept uniform throughout the length of this slidable travel. By the same token it is preferable but not essential that the slots in the body extend longitudinally (axially) to a locus beyond the inner end of the above-mentioned guiding and supporting member. This enables the shanks of the fishhooks to extend outwardly or radially at angles of 90° or more from the longitudinal axis of the body thereby enhancing the likelihood of the barbs being properly set within the mouth of the fish as the bait is taken.

BRIEF DESCRIPTION OF THE FIGURES

The foregoing and other advantages, features, characteristics and embodiments of this invention will become still further apparent from the ensuing description, the appended claims, and the accompanying drawing in which:

FIG. 1 is an isometric view of a preferred fishhook assembly of the present invention shown with the fishhooks in retracted or nested position;

FIG. 2 is an isometric view of the assembly shown in FIG. 1, with the fishhooks in extended position;

FIG. 3 is a sectional view taken on line 3—3 of FIG. 1;

FIG. 4 is a sectional view taken on line 4—4 of FIG. 2; and

FIG. 5 is an exploded isometric view of the fishhook assembly shown in FIGS. 1 through 4.

DETAILED DESCRIPTION OF PREFERRED EMBODIMENTS

Referring in greater detail to the Drawing in which like numerals indicate like parts throughout the several views, the fishhook assembly of the present invention is designated generally by the reference numeral 10 and comprises an elongated tube or body 12 open at one end 14 and closed at the other end 16. In the form depicted the diameter of tubular chamber 15 is constant throughout its effective length. An eye formation 18 projects exteriorly of the wall which closes the end 16 of the tube 12 and forms a means by which a fishing line (not shown) may be attached to the fishhook assembly of the present invention.

An anchoring element depicted generally as 20, is in the form of a spring wire bent so as to have a looped central portion 17 and a pair of arms 19 tending when under compression to move divergently from each other. Each arm has intermediate its length an outwardly extending apex portion 21 positioned to snugly rest against the wall of chamber 15 and to slide therealong upon application to element 20 of a longitudinally directed force, i.e., a force toward or away from open end 14, depending, of course, upon where element 20 is located when such force is applied. For best results, anchoring element 20 should be sized relative to the diameter of chamber 15 such that the arms 19 of element 20 are kept under continuous tension sufficient to maintain the snug contact between the apex portions 21 and the wall of chamber 15 without at the same time excessively impairing slidable travel of apex portions 21 in either selected axial direction along the wall of chamber 15. Fishhooks, shown as two in number in pursuance of the preferred embodiment depicted and designed by the numeral 22, are normally arranged in spaced nested relation within body 12, as shown in FIGS. 1 and 3. Each fishhook 22 has a shank 24, a barb 26, and a loop 25 at its inner end, loop 25 being linked with the looped central portion 17 of anchoring element 20. As a consequence any longitudinally (axially) directed force applied to a fishhook 22 is applied longitudinally (axially) to anchoring element 20 and will cause the same to slide longitudinally (axially) within chamber 15 unless of course slidable travel is prevented by virtue of element 20 being forced against the disc or integral wall which closes the end 16 of body 12 or against plug 30.

Plug 30 serves as a guiding and supporting member and is positioned within body 12 inwardly of and adjacent the open end 14 of the latter and is fixedly secured to body 12 by a suitable adhesive or other attaching means. The flange or rim of plug 30 is provided with a plurality of grooves or openings 32 extending axially therealong. As indicated in the Drawing grooves or openings 32 are each adapted to slidably receive the shank 24 of a fishhook. In body 12 there is a slot 31 adjacent each groove or opening 32 and in the preferred form depicted, each slot 31 extends longitudinally in a forward direction to a locus beyond the inner end of plug 30. It will also be noted that in the preferred form depicted there are two slots 31, and two grooves or openings 32 to accommodate the two fishhooks used in this particular embodiment. And in the form depicted, these slots 31 and their respective adjacent openings 32 are disposed at substantially 180° relative to each other—note especially FIG. 5. It will be appreciated of course that three or more fishhooks may be employed and in such case the corresponding number of slots 31 and adjacent openings 32 will normally be spaced at essentially equal arcuate distances around the circumference of body 12 and plug 30, although other configurations are possible and permissible.

Plug 30 serves as the means not only of guiding axial slidable travel of the fishhooks but in addition upon application of a pulling force upon one or more fishhooks 22, plug 30 causes the fishhooks 22 to project progressively outwardly from openings 32 and slots 31 in divergent directions as the apex portions 21 of element 20 progressively slidably travel toward the inner end of plug 30. In short, plug 30 serves as a fulcrum to force the fishhooks to spread apart as the fishhooks are pulled toward the back end of assembly 10. Consequently the barbs 26 of the fishhooks 22, which barbs are positioned exteriorly of body 12, are moved from the nested converged position shown in FIG. 1 to the diverged position shown in FIG. 2 upon execution of movement of element 20 from the normal position in proximity to the forward closed end 16 of body 12 to a position approaching plug 30.

The barbs 26 of the fishhooks 22 face away from the guide member or plug 30 both in the nested position against plug 30, as shown in FIG. 1 and in the diverged position away from plug 30, as shown in FIG. 2.

In use, a fishing line is attached to the eye formation 18 and bait (not shown) is either slipped down to the body of the tube 12 or is anchored in the portions of the fishhooks 22 adjacent the barbs 26. The bait may be attached to one fishhook 22 or several baits may be attached one to each fishhook 22. Upon casting of the fishhook assembly 10 with the bait attached into a body of water, upon taking of the bait by a fish on one or more fishhooks 22, the application of a pulling force by the fish to one of the barbs 26 will effect the sliding movement of anchoring element 20 from the position adjacent the closed end 16 toward the open end 14 with the result that the intermediate portions of the shanks 24 of the fishhooks 22 will engage the guiding surfaces of the plug 30 so as to project the fishhooks 22 to a position out of the open end of the tube 12 with the projecting portions in diverging directions and with the barbs 26 engaging opposite sides of the mouth of the fish which has taken the bait.

Upon the application of a manually directed force to the fishhooks 22 to reinsert them through the openings 32, the barbs 26 will converge together and make possible the removal of the fish caught thereon.

Because anchoring element 20 slides along the interior bore of body 12 by means of smooth apex portions of small surface area, sticking or wedging of element 20 within the tube is not encountered. The assembly functions well even after exposure to fluctuating temperatures, immersion in water, and exposure to salts, grit, and other types of small water borne debris.

I claim:

1. A fishhook assembly comprising:
   (i) a body having therein a tubular chamber open at one end and having a plurality of slots extending longitudinally from the open end thereof;
   (ii) an anchoring element positioned within said chamber, said anchoring element being in the form of a spring wire having a looped central portion and a pair of arms which, when under compression causing them to move convergently toward each other, inherently tend to move divergently from each other, each arm having intermediate its length an outwardly extending apex portion positioned to snugly rest against the wall of said tubular chamber and to slide therealong upon application to the element of a longitudinally directed force;
   (iii) a plurality of fishhooks each including a shank, a barb at one end of the shank and a loop at the other end of the shank, each said fishhook being fastened by means of said loop to the looped central portion of said anchoring element, said shanks arranged in spaced nested relation within said tubular chamber when said element is away from the open end of said body; and (iv) a guiding and supporting member positioned within said body inwardly of and adjacent the open end of said body and fixedly attached to said body, said member having a plurality of openings extending therealong, each opening being adjacent a slot in said body, said member also having a guiding surface adjacent each said opening, said guiding surface being adapted to slidably receive the shank of a fishhook and upon application of a pulling force upon a fishhook to cause said fishhooks to project outwardly from said openings and through said slots in divergent directions as the apex portions of said element slidably travel toward said member.

2. A fishhook assembly in accordance with claim 1 wherein the tubular chamber of said body has the same diameter throughout its effective length.

3. A fishhook assembly in accordance with claim 1 further characterized by having two said slots in said body, by having two said openings in said guiding and supporting member, and by having two said fishhooks, said slots and their respective adjacent openings being disposed at substantially 180° relative to each other.

4. A fishhook assembly in accordance with claim 1 wherein said slots in said body extend longitudinally to a locus beyond the inner end of said guiding and supporting member.

5. A fishhook assembly in accordance with claim 1 wherein the tubular chamber of said body has the same diameter throughout its effective length and wherein said slots in said body extend longitudinally to a locus beyond the inner end of said guiding and supporting member.

6. A fishhook assembly in accordance with claim 1 further characterized in that the tubular chamber of said body has the same diameter throughout its effective length, in that there are two said slots in said body, in that there are two said openings in said guiding and supporting member, and in that there are two said fishhooks in said assembly, said slots and their respective adjacent openings being disposed at substantially 180° relative to each other.

7. A fishhook assembly in accordance with claim 1 further characterized in that the tubular chamber of said body has the same diameter throughout its effective length, in that there are two said slots in said body, in that there are two said openings in said guiding and supporting member, in that there are two said fishhooks in said assembly, said slots and their respective adjacent openings being disposed at substantially 180° relative to each other, and in that said slots in said body extend longitudinally to a locus beyond the inner end of said guiding and supporting member.

* * * * *